(12) United States Patent
Stout et al.

(10) Patent No.: US 9,093,934 B2
(45) Date of Patent: Jul. 28, 2015

(54) METHODS AND SYSTEMS FOR CONTROLLING A MOTOR

(71) Applicant: Regal Beloit America, Inc., Beloit, WI (US)

(72) Inventors: Bryan J. Stout, Fort Wayne, IN (US); Gregory P. Sullivan, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 230 days.

(21) Appl. No.: 13/833,331

(22) Filed: Mar. 15, 2013

(65) Prior Publication Data
US 2014/0265981 A1   Sep. 18, 2014

(51) Int. Cl.
*H02H 7/00* (2006.01)
*H02H 7/08* (2006.01)
*H02P 6/08* (2006.01)

(52) U.S. Cl.
CPC ....................................... *H02P 6/08* (2013.01)

(58) Field of Classification Search
CPC .................................................... H02K 11/90
USPC ................. 318/490, 504, 701, 721, 720, 719; 340/500
See application file for complete search history.

(56) References Cited

U.S. PATENT DOCUMENTS

| 3,786,242 | A  | * | 1/1974  | Brooks ............................. 703/4 |
| 4,458,532 | A  |   | 7/1984  | Goebel |
| 5,202,610 | A  | * | 4/1993  | Frye et al. ......................... 318/6 |
| 6,925,412 | B2 |   | 8/2005  | Rauer et al. |
| 7,082,352 | B2 | * | 7/2006  | Lim .............................. 700/276 |
| 7,279,859 | B2 |   | 10/2007 | Hill |
| 2007/0057652 | A1 | * | 3/2007  | Hoffman et al. .............. 323/258 |
| 2011/0260671 | A1 | * | 10/2011 | Jeung ............................ 318/701 |
| 2012/0293106 | A1 | * | 11/2012 | Hirt ............................... 318/722 |
| 2012/0326643 | A1 | * | 12/2012 | Brannen .................. 318/400.11 |

* cited by examiner

*Primary Examiner* — Rita Leykin
(74) *Attorney, Agent, or Firm* — Armstrong Teasdale LLP

(57) ABSTRACT

A control system for controlling a motor having a stator and a rotor coupled to the stator is provided. The control system includes a plurality of input taps and an input coupled to the plurality of input taps. The input is configured to transmit an input voltage to at least one input tap of the plurality of input taps. The control system also includes a microcontroller coupled to the input. The microcontroller is programmed to determine the at least one input tap of the plurality of input taps that is asserted by the input voltage; access from a memory a predetermined input condition; detect an invalid operating input condition of the motor based on a comparison of the predetermined input condition and the at least one input tap of the plurality of input taps that is asserted by the input; and perform a function to change an operating characteristic of the motor.

20 Claims, 4 Drawing Sheets

METHODS AND SYSTEMS FOR CONTROLLING A MOTOR

BACKGROUND OF THE INVENTION

The embodiments described herein relate generally to motors, and more particularly, to methods and systems used to control operating characteristics of the motor.

Electronically commutated motors (ECMs) (such as for example Brushless AC and/or DC motors), are used in a variety of systems operating in a variety of industries. ECMs are used to power products such as fans used in heating, ventilation and air conditioning systems (HVAC). ECMs are subject to many operating conditions and often, the operating conditions necessitate that operating characteristics of the ECM change to match the requirements of the associated application (i.e., different speeds, airflow requirements for HVAC applications and/or rotation direction). More specifically, control circuits for ECMs may need to be changed to enable the ECM to operate with different operating characteristics for different applications and/or for different voltage levels.

In some known systems, the speed-torque characteristics of motors are an integral part of the design and rating of the system. When the motor within such a system is upgraded to include a brushless direct current (DC) motor or an existing motor is repaired/retrofitted, the characteristics that depend on the speed-torque curve of the upgraded/repaired motors may have to be re-evaluated. The re-evaluation is necessary since the new ECM could have a different speed-torque curve than the previous ECM and consequently, if provided with a different speed-torque curve as the previous ECM, operate at several hundred RPMs faster than the previous ECM's capabilities. This operational characteristic of an ECM can result in the ECM having higher or lower speeds under some conditions than it did prior to upgrade or retrofit/repair. Moreover, the operational characteristic of an ECM can result in the replacement ECM having a different rotation than the existing motor.

A conventional method of reconfiguring operating characteristics for a replacement motor may include the execution of a learning feature in which the replacement motor learns the application and sets new operating characteristics and/or returning the motor to a default set of operating characteristics. Reconfiguration of the operating characteristics, because of an incorrectly applied motor, may not result in the desired operating characteristics. Repeating the learning process, for example, may continue to evaluate the environment inaccurately resulting in the possible inability to obtain desired results for the operating characteristics.

BRIEF DESCRIPTION OF THE INVENTION

In one aspect, a control system for controlling a motor having a stator and a rotor coupled to the stator is provided. The control system includes a plurality of input taps and an input coupled to the plurality of input taps. The input is configured to transmit an input voltage to at least one input tap of the plurality of input taps. The control system also includes a microcontroller coupled to the input. The microcontroller is programmed to determine the at least one input tap of the plurality of input taps that is asserted by the input voltage; access from a memory a predetermined input condition; detect an invalid operating input condition of the motor based on a comparison of the predetermined input condition and the at least one input tap of the plurality of input taps that is asserted by the input; and perform a function to change an operating characteristic of the motor based on the invalid operating input.

In another aspect, a motor having an axis of rotation is provided. The motor includes a stator and a rotor coupled to the stator. A control system is coupled to the stator. The control system includes a plurality of input taps and an input coupled to the plurality of input taps. The input is configured to transmit a voltage to at least one input tap of the plurality of input taps. A microcontroller is coupled to the input. The microcontroller includes a processor programmed to determine the at least one input tap of the plurality of input taps that is asserted by the input voltage; access from a memory a predetermined input condition; detect an invalid operating input condition of the motor based on a comparison of the predetermined input condition and the at least one input tap of the plurality of input taps that is asserted by the input; and perform a function to change an operating characteristic of the motor based on the invalid operating input.

In yet another aspect, a method of configuring a motor having a microcontroller and a plurality of input taps that is coupled to an input voltage is provided. The method includes asserting at least one input tap of the plurality of input taps for a predetermined period of time by transmitting an input voltage from the power source to the at least one input tap. The method further includes converting the input voltage to a DC voltage and determining, via the microcontroller, the at least one input tap of the plurality of input taps that is asserted by the input voltage. The method includes accessing, via the microcontroller, a predetermined input condition. An invalid operating input condition is detected based on a comparison of the predetermined input condition and the at least one input tap of the plurality of input taps that is asserted by the input voltage. The method includes performing a function to change an operating characteristic of the motor.

DETAILED DESCRIPTION OF THE INVENTION

The embodiments described herein relate to motors and methods of configuring the motors. More particularly, the embodiments relate to a control system that configures operating characteristics of the motor. It should be understood that the embodiments described herein are not limited to replacement motors, and further understood that the descriptions and figures that utilize a motor, a control system and a heating, ventilation and air conditioning ("HVAC") are exemplary only. Moreover, while the embodiments illustrate a three phase electric motor, the embodiments described herein may be included within motors having any number of phases, including single phase and multiple phase electric motors.

Figure 1:
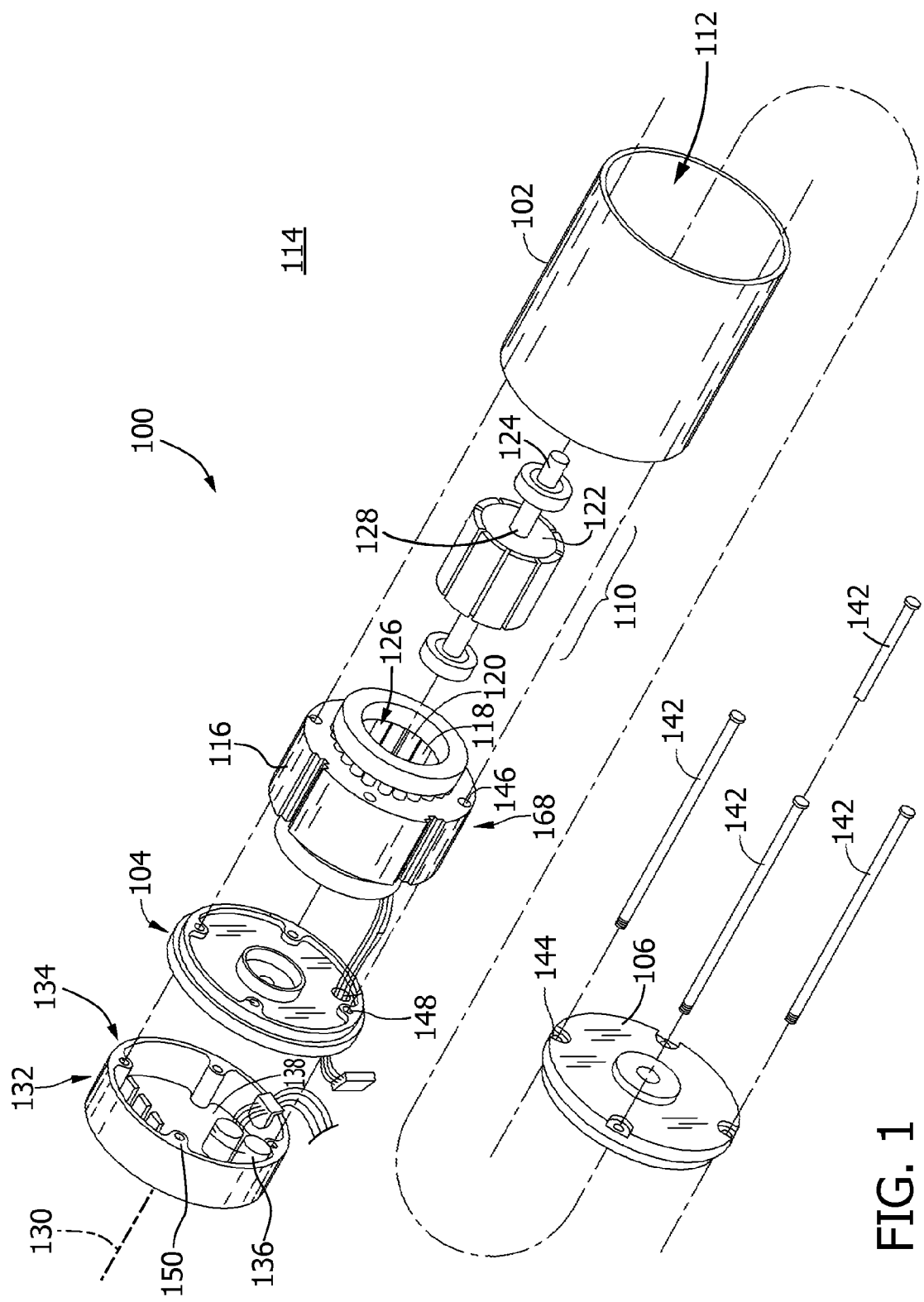
FIG. 1 is an exploded cutaway view of an exemplary electric motor and an exemplary control system coupled to motor for use in controlling operation of motor.

FIG. 1 is an exploded cutaway view of an exemplary motor 100 and an exemplary control system 134 coupled to motor 100. Electric motor 100 includes a housing 102 having a first end cap 104 and a second end cap 106. Electric motor 100 further includes a stationary assembly 108 and a rotatable assembly 110. Motor assembly housing 102 defines an interior 112 and an exterior 114 of motor 100 and is configured to at least partially enclose and protect stationary assembly 108 and rotatable assembly 110. Stationary assembly 108 includes a stator 116, which includes a plurality of stator teeth 118 and a plurality of winding stages 120 wound around stator teeth 118 and adapted to be electronically energized to generate an electromagnetic field. In the exemplary embodiment, a variable frequency drive (not shown) provides a signal, for example, a pulse width modulated (PWM) signal, to electric motor 100.

In an exemplary embodiment, stationary assembly 108 is a three phase concentrated wound stator assembly and stator 116 is formed from a stack of laminations (not shown) made of a magnetically permeable material. While stationary assembly 108 is illustrated for purposes of disclosure, it is contemplated that other stationary assemblies of various other constructions having different shapes, configurations, phases and different numbers of teeth may be utilized.

Rotatable assembly 110 includes a rotor 122 such as, for example, permanent magnet rotor or an induction rotor and a shaft 124. Rotatable assembly 110 may also be referred to as an interior permanent magnet rotor. Examples of motors 100 that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors. In one embodiment, motor 100 includes a brushless DC motor having a known classification of a "56 Frame 3Hp" motor, which is a three-phase motor.

In the exemplary embodiment, rotor 122 is formed from a stack of laminations (not shown) made of a magnetically permeable material and is substantially received in a central bore 126 of stator 116. Rotor 122 includes a shaft opening 128 having a diameter corresponding to a diameter of shaft 124. Rotor 122 and shaft 124 are concentric and configured to rotate about an axis of rotation 130. Stator 116 and rotor 122 are illustrated as being solid in FIG. 1 for simplicity, their construction being well known to those of ordinary skill in the art. For example, stator 116 and rotor 122 may be formed using a sintering process from a soft magnetic composite (SMC) material, a soft magnetic alloy (SMA) material, and/or a powdered ferrite material.

Winding stages 120 are commutated without brushes by sensing the rotational position of rotatable assembly 110 as it rotates within stator 116 and utilizing electrical signals generated as a function of the rotational position of rotatable assembly 110 sequentially to apply a voltage to each of winding stages 120 in different preselected orders or sequences that determine the direction of the rotation of rotatable assembly 110.

Motor 100 further includes an enclosure 132 which supports a control system 134. Control system 134 includes a plurality of electronic components 136 coupled to a component board 138, such as a printed circuit board. Control system 134 is connected to winding stages 120 and applies a voltage to one or more winding stages 120 at a time for commutating winding stage 128 in a preselected sequence to rotate rotatable assembly 110 about axis of rotation 130. Position sensing may be accomplished by a position-detecting circuit (not shown) responsive to the back electromotive force (EMF) to provide a simulated signal indicative of the rotational position of rotatable assembly 110 to control the timed sequential application of voltage to winding stages 120 of stationary assembly 108. Other means of position sensing may also be used.

Connecting elements 142 include a plurality of bolts that pass through bolts holes 144 in second end cap 106, bolt holes 146 through stator 116, bolt holes 148 though first end cap 104 and bolt holes 150 in enclosure 132. Connecting elements 142 are adapted to couple first end cap 104 and second end cap 106 thereby supporting stationary assembly 108 and rotatable assembly 110.

Figure 2:
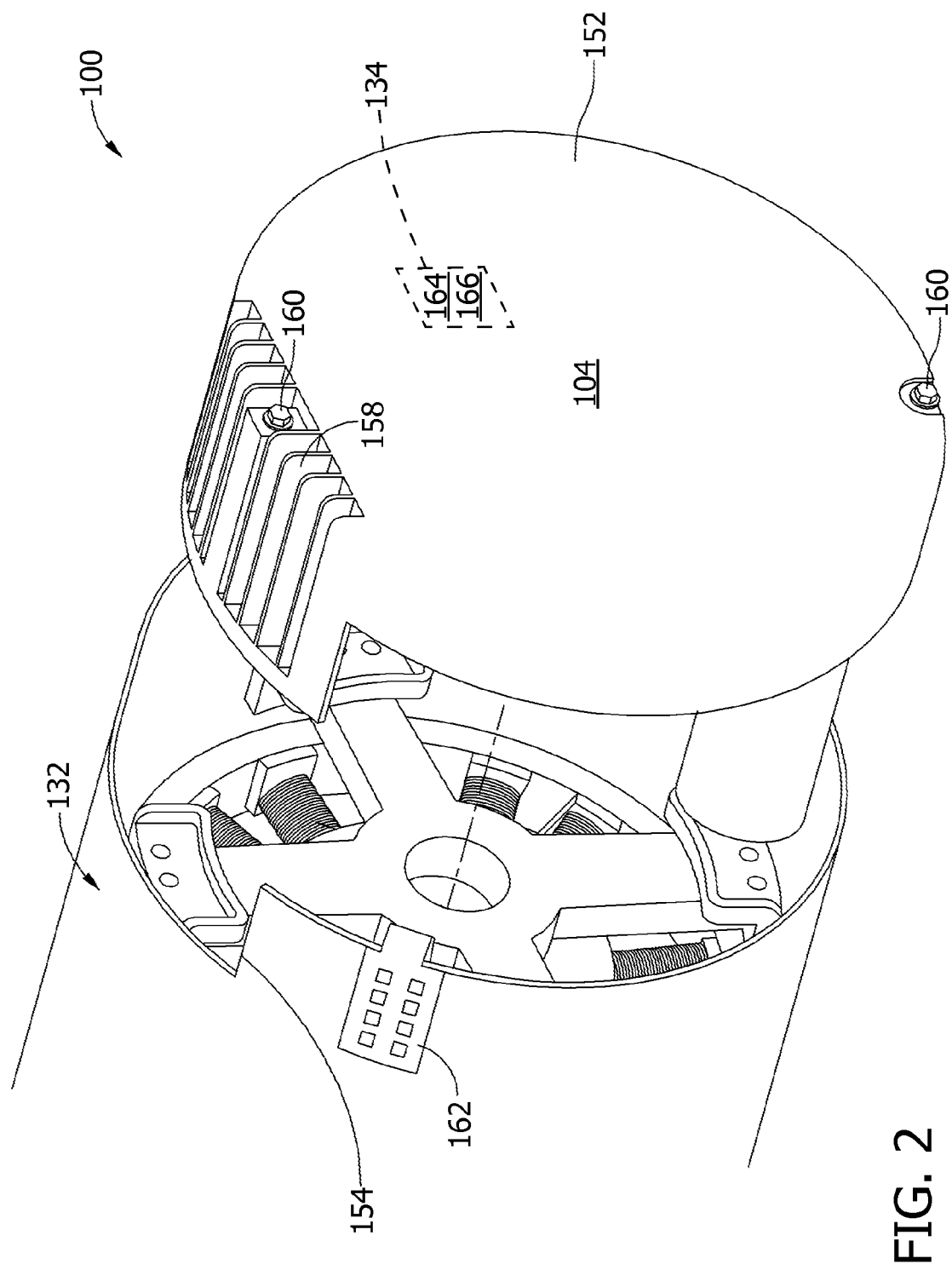
FIG. 2 is an exploded partial view of the motor of FIG. 1 and the control system coupled to the motor.

FIG. 2 is an exploded partial view of motor 100 and control system 134 coupled to motor 100. In the exemplary embodiment, a chassis 152 of housing 102 serves as first end cap 104 for motor 100. Motor enclosure 132 also includes a slot 154 which engages a heat sink 158 formed in chassis 152. In one embodiment, fasteners 160 pass through first end cap 104 to secure control system 134 within motor enclosure 132. This alignment and symmetry remain even when chassis 152 containing electronic components 136 of control system 134 is removed. Retaining the alignment and symmetry within enclosure 132 is important as it lowers a replacement cost of control system 134 in the field. Additionally, such a configuration allows for placement of a power connector 162 flush with enclosure 132. Motor 100 includes a voltage rating 164 which is determined by motor manufacturer and which is stored in control system 134. Motor 100 further includes a pre-determined operating threshold 166, which is also stored in control system 134, for efficient operation of motor 100.

Figure 3:
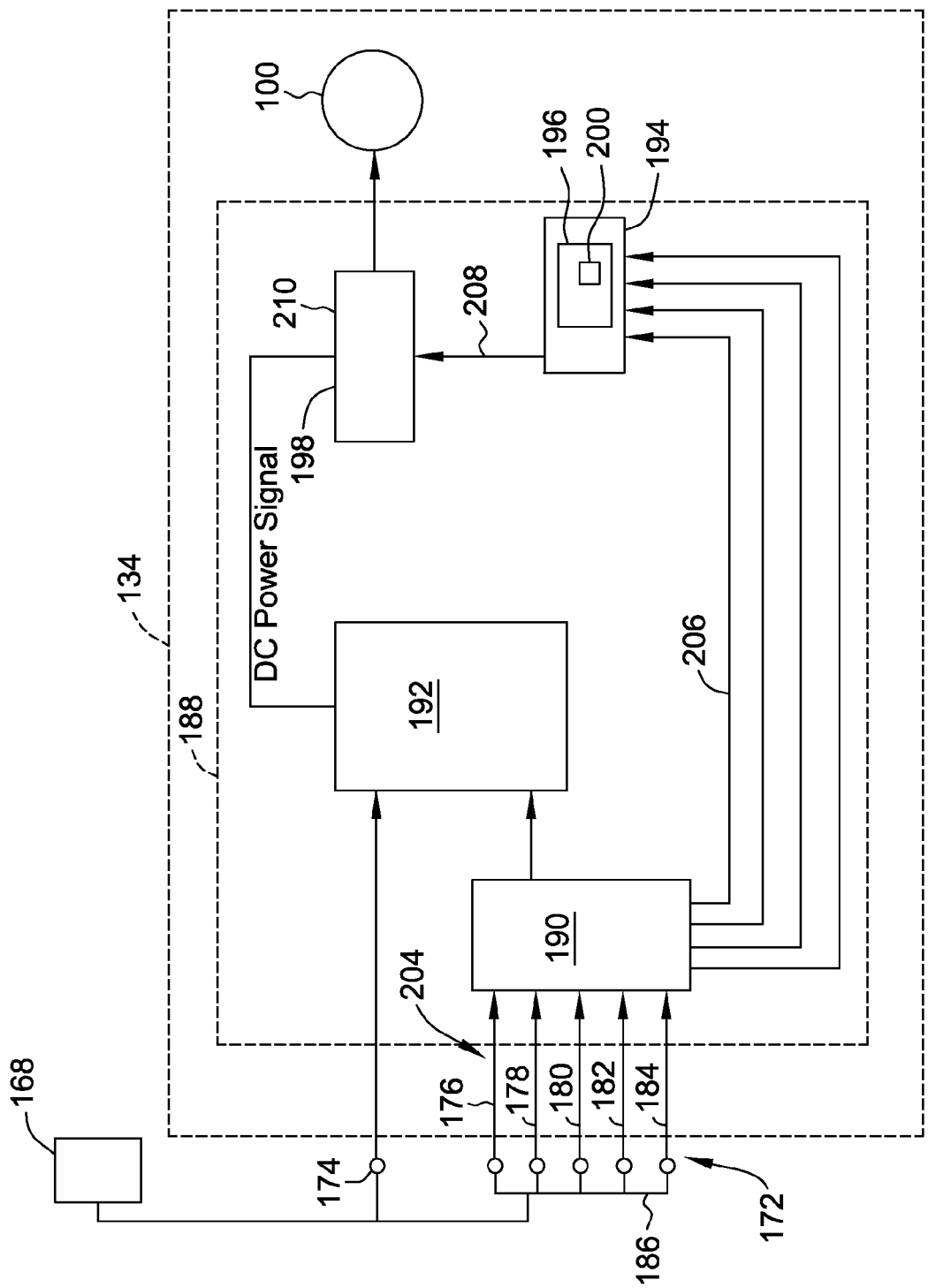
FIG. 3 is a block diagram of the exemplary motor and control system shown in FIG. 1.

FIG. 3 is a block diagram of control system 134 coupled to motor 100. In the exemplary embodiment, control system 134 is coupled to motor 100 and one or more input voltages 168 that is configured to transmit AC power/signals such as, but not limited to, high and/or low voltages. Input voltage 168 is connected to one or more of input taps 172 and a terminal 174 coupled to power source 168. In the exemplary embodiment, the plurality of input taps 172 includes a first input tap 176, a second input tap 178, a third input tap 180, a fourth input tap 182 and a fifth input tap 184. Alternatively, the plurality of input taps 172 may include any number of input taps 172 to enable motor to function as described herein.

Input voltage 168 (for example, a voltage between about 100 V and about 250 V) t is transmitted to the plurality of input taps 172. The plurality of input taps 172 can be coupled to the same wiring/terminals as an AC motor (not shown) being replaced (e.g., via individual wires, via a plug/socket arrangement, or otherwise). Moreover, the plurality of input taps 172 may be coupled to AC power source 168 in response to control signals from a thermostat (not shown) (e.g., wherein the thermostat opens or closes relays between AC power source 168 and the plurality of input taps 172).

Control system 134 further includes a microcontroller 188 coupled to the plurality of input taps 172 and terminal 174. Microcontroller 188 includes an isolator 190, a rectifier 192, a processor 194 having a memory 196 and a switch driver 198. Isolator 190 is coupled to the plurality of input taps 172, rectifier 192 and processor 194. Isolator 190 includes transformers (not shown) and current detecting circuits or comparator circuits (not shown). One or more of the transformers can be in the form of a current transformer, which can be used to measure current. In certain embodiments, transformers can be a micro-current transformer. Rectifier 192 is coupled to switch driver 198 and is configured to convert AC power signal of power source 168 to a DC power signal, wherein the DC power signal is supplied to switch driver 198. Moreover, processor 194 is coupled to switch driver 198, wherein memory 196 includes a predetermined input condition 200. In the exemplary embodiment, predetermined input condition 200 includes at least one of a predetermined speed, direction of rotation, torque and horsepower.

During a replacement procedure, a user such as an installer or technician, disconnects an existing motor (not shown) from an application (not shown), such as an HVAC unit. The installer couples motor 100 to HVAC unit and selectively energizes at least one input tap 204 of the plurality of input taps 172 to transmit input voltage 168 to at least one input tap 204 of the plurality of input taps 172.

Processor 194 accesses and executes software (not shown) (e.g., firmware and/or other programmatic code) to control operation of motor 100. Processor 194 is configured to determine which at least one input tap 204 of the plurality of input taps 172 is asserted by input voltage 168 via detection by isolator 190. Processor 194 accesses from memory 196 predetermined input condition 200. In the exemplary embodiment, processor 194 is configured to detect an invalid input condition 206 of motor 100 based on a comparison of predetermined input condition 200 and at least one input tap 204 that is asserted by input voltage 186. Moreover, processor 194 is configured to command rotor 122 via switch driver 198 corresponding to predefined operating characteristic 210 of motor 100. More particularly, processor 194 performs a calculation process to generate signal 208 corresponding to input voltage 168.

Signal 208 generated by processor 194 is transmitted to switch driver 198 to control the current and/or power supplied to motor 100. In the exemplary embodiment, operating characteristic 210 includes at least one of a speed of motor 100, a direction of rotation of motor 100, a torque of motor 100 and a horsepower of motor 100.

Processor 194 is programmable so that predetermined input condition 200 of motor 100 can be changed and/or overridden by installer based on information presented to installer by at least one of an operating manual (not shown), a look up table (not shown) and application operation instructions (not shown). Any information can be used to change/override input condition 200 to enable motor 100 to function as described herein. More particularly, the installer can selectively energize at least one input tap 204 of the plurality of input taps 172 to command motor 100 to perform a function to change an operating characteristic 210. In the exemplary embodiment, three input taps 172 of the plurality of input taps 172 are asserted by input voltage 186 to control a specific direction of motor 100. Alternatively, first input tap 176, second input tap 178 and fifth input tap 184 are asserted by input voltage 186 for a predetermined period of time to control a direction of rotation of motor 100. In one embodiment, third input tap 180 is asserted to control a low horsepower of motor 100, fourth input tap 182 is asserted to control a medium horsepower of motor 100 and fifth input tap 184 is asserted to control a high horsepower of motor 100.

Figure 4:
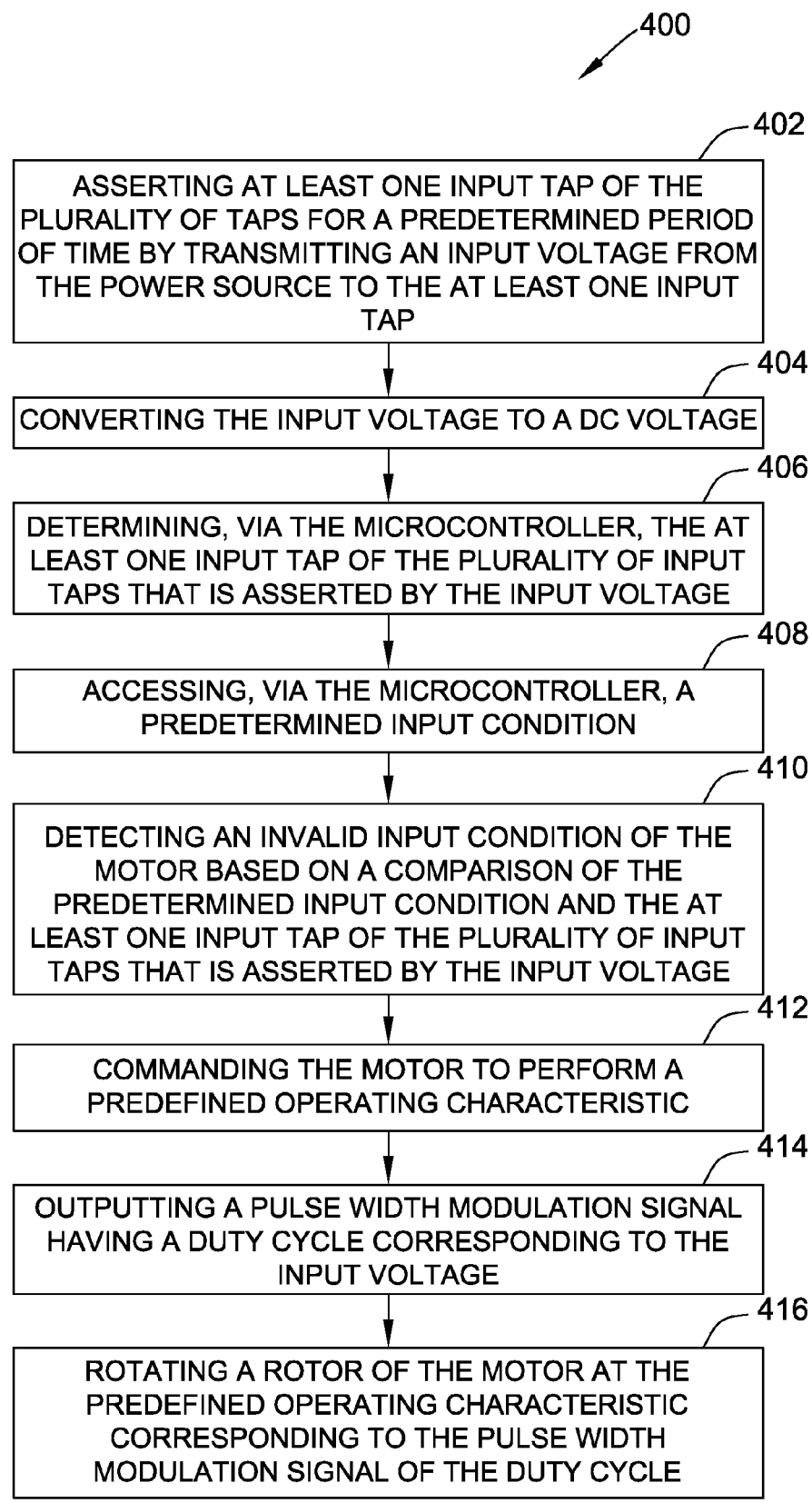
FIG. 4 is an exemplary flowchart illustrating a method of configuring a motor.

FIG. 4 is an exemplary flowchart illustrating a method 400 of configuring a motor, for example motor 100 (shown in FIG. 1). The motor includes a microcontroller, such as microcontroller 188 (shown in FIG. 3), and a plurality of input taps, for example input taps 172 (shown in FIG. 3), that is coupled to a power source, for example power source 168 (shown in FIG. 3). Method 400 includes asserting 402 at least one input tap 204 of the plurality of input taps 172 for a predetermined period of time by transmitting an input voltage, for example input voltage 186 (shown in FIG. 3), from the power source to the at least one input tap. Method 400 further includes converting 404 the input voltage to a DC voltage and determining 406, via the microcontroller, the at least one input tap of the plurality of input taps that is asserted by the input voltage.

In the exemplary embodiment, method 400 includes accessing 408, via the microcontroller, a predetermined input condition, for example predetermined input condition 200 (shown in FIG. 3). An invalid input condition, for example invalid input condition 206 (shown in FIG. 3), is detected 410 based on a comparison of the predetermined input condition and the at least one input tap of the plurality of input taps that is asserted by the input voltage. Method 400 includes 412 commanding the motor to perform a function to change an operating characteristic of the motor, such as operating characteristic 210 (shown in FIG. 3). Method 400 further includes rotating 416 a rotor, for example rotor 122 (shown in FIG. 1), of the motor corresponding to the changed operating characteristic of the motor.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

Many conventional HVAC systems utilize alternating current (AC) motors for air handlers and condensers. The use of AC motors in an HVACR application may result in a relatively inefficient operation. By contrast, an ECM typically uses less energy than an AC motor or permanent-split capacitor motor such as are commonly used to move air in HVAC systems. The ECM may also offer more control over the motor speed than conventional AC motors, which is also beneficial in HVAC applications.

The exemplary embodiments described herein facilitate configuring a motor. More particularly, the exemplary embodiments are configured to enable efficient and cost effective replacement of an installed AC motor, such as is frequently used in an HVAC system, with an efficient ECM or other DC motor as a drop-in replacement motor. The exemplary embodiments described herein facilitate configuring and/or reconfiguring motor operating characteristics directly by an installer while minimizing and/or reducing the process steps, time and uncertainty associated with existing learning programs.

A technical effect of the systems and methods described herein includes at least one of: a control system for controlling a motor having a stator and a rotor coupled to the stator wherein the control system includes a plurality of input taps and an input coupled to the plurality of input taps. A microcontroller is coupled to the input. The microcontroller is programmed to determine the at least one input tap of the plurality of input taps that is asserted by the input voltage; access from a memory a predetermined input condition; detect an invalid input condition of the motor based on a comparison of the predetermined input condition and the at least one input tap of the plurality of input taps that is asserted by the input; and perform a function to change an operating characteristic of the motor.

Exemplary embodiments of a motor and methods for configuring the motor are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

While the embodiments described herein are described with respect to motors in which a stator surrounds a rotor such as, for example, a permanent magnet rotor or an induction rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system for controlling a motor having a stator and a rotor coupled to the stator, said control system comprising:
   a plurality of input taps;
   an input coupled to the plurality of input taps and configured to transmit an input voltage to at least one input tap of said plurality of input taps; and
   a microcontroller coupled to said input, said microcontroller comprising a processor programmed to:
      determine said at least one input tap of the plurality of input taps that is asserted by said input;
      access from a memory a predetermined input condition;
      detect an invalid operating input condition of the motor based on a comparison of said predetermined input condition and said at least one input tap of said plurality of input taps asserted by said input; and
      perform a function to change an operating characteristic of the motor based on said invalid operating input condition.

2. The control system of claim 1, wherein said processor is further programmed to output a signal corresponding to a valid operating input.

3. The control system of claim 2, wherein said processor is further programmed to rotate the rotor corresponding to said changed operating characteristic.

4. The control system of claim 1, wherein said operating characteristic comprises a speed of the motor.

5. The control system of claim 1, wherein said operating characteristic comprises a rotational direction of the motor.

6. The control system of claim 1, said wherein said operating characteristic comprises a torque of the motor.

7. The control system of claim 1, wherein said operating characteristic comprises a horsepower of the motor.

8. A motor, said motor comprising:
   a stator,
   a rotor coupled to said stator; and
   a control system coupled to said stator, said control system comprising:
      a plurality of input taps;
      an input coupled to said plurality of input taps and configured to transmit a voltage to at least one input tap of said plurality of input taps; and
      a microcontroller coupled to said input, said microcontroller comprising a processor programmed to:
         determine said at least one input tap of said plurality of input taps that is asserted by said input;
         access from a memory a predetermined input condition;
         detect an invalid operating input condition of the motor based on a comparison of said predetermined input condition and said at least one input tap of said plurality of input taps asserted by said input; and
         perform a function to change an operating characteristic of the motor based on said invalid operating input condition.

9. The motor of claim 8, wherein said processor is further programmed to output a signal corresponding to a valid operating input.

10. The motor of claim 9, wherein said signal instructs the rotor to rotate at said operating characteristic.

11. The motor of claim 8, wherein said operating characteristic comprises at least one of a speed of said motor, a direction of rotation of said motor, a torque of said motor and a horsepower of said motor.

12. A method of configuring a motor having a microcontroller and a plurality of input taps coupled to a power source, said method comprising:
   asserting at least one input tap of the plurality of taps by transmitting an input voltage from the power source to the at least one input tap;
   converting the input voltage to a DC voltage;
   determining, via the microcontroller, the at least one input tap of the plurality of input taps that is asserted by the input voltage;
   accessing, via the microcontroller, a predetermined input condition;
   detecting an invalid operating input condition of the motor based on a comparison of the predetermined input condition and the at least one input tap of the plurality of input taps asserted by the input voltage; and
   performing a function to change an operating characteristic of the motor based on the invalid operating input condition.

13. The method of claim 12, wherein performing the function to change the operating characteristic comprises controlling a speed of the motor.

14. The method of claim 12, wherein performing the function to change the operating characteristic comprises controlling a rotational direction of the motor.

15. The method of claim 12, wherein performing the function to change the operating characteristic comprises controlling a torque of the motor.

16. The method of claim 12, wherein performing the function or to change the operating characteristic comprises controlling a horsepower of the motor.

17. The method of claim 12, wherein asserting three input taps of the plurality of input taps comprises controlling a rotation direction of the motor.

18. The method of claim 12, wherein the plurality of input taps includes a first input tap, a second input tap, a third input tap, a fourth input tap and a fifth input tap.

19. The method of claim 18, wherein asserting the first input tap, the second input tap and the fifth input tap for a predetermined period of time comprises controlling a direction of the motor.

20. The method of claim 18, wherein asserting the third input tap comprises controlling a low horsepower of the motor, asserting the fourth input tap comprises controlling a medium horsepower of the motor and asserting the fifth input tap comprises controlling a high horsepower of the motor.

* * * * *